United States Patent [19]

Pedain et al.

[11] 4,118,376

[45] Oct. 3, 1978

[54] HYDROCURABLE OXAZOLIDINE ISOCYANATE PREPOLYMER COMPOSITIONS

[75] Inventors: Josef Pedain; Wolfgang Wellner, both of Cologne; Hermann Gruber; Manfred Dietrich, both of Leverkusen, all of Germany

[73] Assignee: Bayer Aktiengesellschaft, Leverkusen, Germany

[21] Appl. No.: 817,083

[22] Filed: Jul. 18, 1977

[30] Foreign Application Priority Data

Jul. 20, 1976 [DE] Fed. Rep. of Germany ....... 2632513

[51] Int. Cl.$^2$ ............................................. C08G 18/00
[52] U.S. Cl. ...................................... 528/59; 528/62; 528/73
[58] Field of Search .................... 260/77.5 R, 77.5 AQ

[56] References Cited

U.S. PATENT DOCUMENTS

| | | | |
|---|---|---|---|
| 3,325,421 | 6/1967 | Muller | 260/77.5 AM |
| 3,383,351 | 5/1968 | Stamberger | 260/47 EP |
| 3,661,923 | 5/1972 | Emmons et al. | 260/45.8 NZ |
| 3,743,626 | 7/1973 | Emmons | 260/77.5 AQ |
| 3,864,335 | 2/1975 | Emmons | 260/307 F |
| 4,002,601 | 1/1977 | Hajek et al. | 260/77.5 AT |

*Primary Examiner*—M. J. Welsh
*Attorney, Agent, or Firm*—Gene Harsh; Lawrence S. Pope

[57] ABSTRACT

The present invention is concerned with a hydrocurable composition suitable for use as coatings, adhesives or grouts. The composition contains oxazolidine compounds and free isocyanate group containing prepolymers. The prepolymers are obtained by the reaction of polyisocyanates with special types of dispersions wherein the dispersed phase is synthesized in situ in a dispersing media of polyhydroxyl compounds. The dispersed phase may be a free radical addition polymer, an aminoplast polycondensate or a polyisocyanate addition product. In the last case, the non-isocyanate reactants used to form the dispersed phase are substantially more reactive with isocyanates than the dispersing media. An especially preferred composition is based on urethane oxazolidines and prepolymers of aliphatic or cycloaliphatic isocyanates with dispersions of isocyanate hydrazine or hydrazine hydrate condensates in polyhydroxy-polyethers having molecular weights of 200 to 16,000.

10 Claims, No Drawings

HYDROCURABLE OXAZOLIDINE ISOCYANATE PREPOLYMER COMPOSITIONS

FIELD OF THE INVENTION

This invention relates to new mixtures based on oxazolidines and organic polyisocyanates, which mixtures are capable of being hardened with water, and to their use as coating and grouting compounds.

BACKGROUND OF THE INVENTION

Mixtures based on oxazolidines and organic polyisocyanates capable of being hardened by water have already been disclosed, for example, in German Offenlegungsschrift No. 2,018,233 (U.S. Patent Specification No. 3,743,626). In German Offenlegungsschrift No. 2,446,438, it is also mentioned that the isocyanate-free oxazolidines described there constitute reactants for organic polyisocyanates which become active only in the presence of moisture and after hydrolytic ring opening.

The mixtures described in German Offenlegungsschrift No. 2,018,233 have, however, various disadvantageous properties. The storage life of systems which are highly reactive due to the presence of aromatic polyisocyanates is very brief even if moisture is excluded. On the other hand, stable preparations based on aliphatic polyisocyanates harden too slowly when exposed to moisture. In particular, it should be noted that, in solvent-free systems used for thick coatings, the skin develops too slowly and when finally formed is too dense and therefore prevents any further penetration of moisture into the coating composition so that complete drying proceeds too slowly. As a result, these coatings often attain their ultimate strength only after weeks or even months and are therefore not suitable for all commercial applications. The surface characteristics of coatings obtained from the preparations according to German Offenlegungsschrift No. 2,018,233 also fail to meet the practical requirements in particular in the case of solvent-free systems and when isocyanate prepolymers are used as the polyisocyanate component. The surface of such coatings is blocking and slightly tacky so that particles of dust and dirt collect on the surface.

It was therefore an object of the present invention to provide new systems which would be free from these disadvantages.

SUMMARY OF THE INVENTION

It has surprisingly been found that this problem can be solved by using, as the polyisocyanate component, isocyanate-containing prepolymers based on organic polyisocyanates and dispersions of polymers, polycondensates or polyaddition products in organic polyhydroxyl compounds.

The present invention thus relates to a mixture capable of being hardened by water, which mixture contains an oxazolidine component and a polyisocyanate component, characterized in that the mixture contains, as polyisocyanate component, an isocyanate prepolymer which has free isocyanate groups and is based on organic polyisocyanate and dispersions of free radical addition polymers, aminoplast polycondensates or polyisocyanate polyaddition products which were synthesized in situ in organic polyhydroxyl compounds.

The present invention also relates to the use of this mixture in combination with auxiliary agents and additives known per se as coating or grouting composition capable of being hardened by moisture.

DETAILED DESCRIPTION OF THE INVENTION

The oxazolidine components in the mixture according to the invention may be any organic compounds having at least one, preferably two or three, groups of the formula

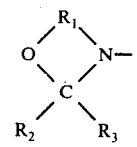

and for the sake of simplicity, they will be referred to as "oxazolidines" in the context of this invention. In the above formula $R_1$ represents an aliphatic hydrocarbon group having from 2 to 6, preferably 2 or 3, carbon atoms and $R_2$ and $R_3$ may be the same or different and represent hydrogen, aliphatic hydrocarbon groups having from 1 to 4 carbon atoms, cycloaliphatic hydrocarbon groups having from 5 to 7 carbon atoms or aromatic hydrocarbon groups having from 6 to 10 carbon atoms or, together with the ring carbon atom, they may represent a five-membered or six-membered cycloaliphatic hydrocarbon ring. $R_2$ and $R_3$ are preferably the same or different groups and represent hydrogen or an aliphatic hydrocarbon group having from 1 to 4 carbon atoms.

Such oxazolidines have been described, for example, in U.S. Patent Specifications Nos. 3,661,923; 3,864,335; 3,743,626 and 4,002,601 and in German Offenlegungsschrift No. 2,446,438.

Preferred oxazolidines in the mixtures according to the invention are those of the formula

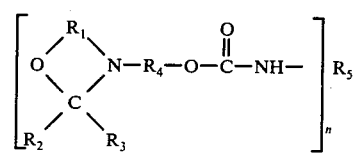

in which $R_1$, $R_2$ and $R_3$ have the meanings specified above an $R_4$ represents an aliphatic hydrocarbon group having from 2 to 6, preferably 2 or 3 carbon atoms.

$R_5$ represents a group which can be obtained by removal of the isocyanate groups from an organic isocyanate having a valency of $n$, preferably a di- or tri-isocyanate and $n$ represents an integer of from 1 to 6, preferably 2 or 3 and especially 2.

The preparation of these preferred oxazolidines has been described in German Offenlegungsschrift No. 2,446,438 and U.S. Pat. No. 4,002,601 incorporated herein by reference. The following are typical examples: N-(isopropyl-1,3-oxazolidin-3-yl)-ethoxycarbonylbenzylamine; N-(2-isopropyl-1,3-oxazolidin-3-yl)-ethoxycarbonyl-stearylamine; N,N'-bis-[(2-isopropyl 1,3-oxazolidin-3-yl)-ethoxycarbonyl]-1,6-diaminohexane; N,N'-bis-[(1,3-oxazolidin-3-yl)-ethoxycarbonyl]-1,6-diaminohexane; N,N'-bis[(2-isopropyl-5-methyl-oxazolidin-3-yl)-iso-propoxycarbonyl]-1,6 diaminohexane; N,N'-bis[(2-isopropyl-oxazolidin-3-yl)-ethoxycarbonyl]-tolylene-2,4-diamine; N,N'-bis-[(2-isopropyl-5-methyl-1,3-oxazolidin-3-yl)-isopropoxycarbonyl]-1-aminomethyl-5-amino-1,3,3-trimethyl-cyclohexane.

Hydrolytic ring opening of these oxazolidines results in the formation of one hydroxyl group and one secondary amino group per oxazolidine ring so that even oxazolidines having only one oxazolidine ring are converted by reaction with water into compounds which are difunctional for the purpose of the isocyanate addition reaction. However, it is particularly preferred to use urethane oxazolidines of the above formula which contain two oxazolidine rings, such as in particular N,N'-bis-[(2-isopropyl-1,3-oxazolidin-3-yl)-ethoxycarbonyl]-1,6-diaminohexane.

In the mixtures according to the invention, the oxazolidines are mixed with quite particular isocyanate prepolymers which are essential to the invention. These prepolymers with isocyanate groups are reaction products of excess quantities of organic polyisocyanates with dispersions of polymers, polycondensates or polyaddition products in organic polyhydroxyl compounds.

Any organic polyisocyanates may be used for the preparation of the prepolymers with isocyanate groups e.g. aliphatic, cycloaliphatic, aromatic or heterocyclic polyisocyanates such as those described, for example, by W. Siefken in Justus Liebigs Annalen der Chemie, 562, pages 75 to 136, for example ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and -1,4-diisocyanate and any mixtures of these isomers; 1-isocyanato-3,3,5-trimethyl-5-isocyanatomethylcyclohexane (German Auslegeschrift No. 1,202,785); hexahydrotolylene-2,4-diisocyanate and -2,6-diisocyanate and any mixtures of these isomers; hexahydrophenylene-1,3-diisocyanate and/or 1,4-diisocyanate; perhydrodiphenylmethane-2,4'-diisocyanate and/or 4,4'-diisocyanate; phenylene-1,3-diisocyanate and -1,4-diisocyanate; tolylene-2,4-diisocyanate and -2,6-diisocyanate and any mixtures of these isomers; diphenylmethane-2,4'-diisocyanate and/or 4,4'-diisocyanate; naphthylene-1,5-diisocyanate; triphenylmethane-4,4',4"-triisocyanate; polyphenyl-polymethylene polyisocyanates which can be obtained by aniline formaldehyde condensation followed by phosgenation and which have been described, for example, in British Patent Specifications No. 874,430 and No. 848,671; perchlorinated aryl polyisocyanates such as those described, for example, in German Auglegeschrift No. 1,157,601; polyisocyanates having carbodiimide groups as described in German Patent Specification No. 1,092,007; diisocyanates of the kind described in U.S. Patent Specification No. 3,492,330; polyisocyanates with allophanate groups as described e.g. in British Patent Specification No. 994,890, Belgian Patent Specification No. 761,626 and published Dutch Patent Application No. 7,102,524; polyisocyanates with isocyanurate groups, e.g. as described in German Patent Specification No. 1,022,789; 1,222,067 and 1,027,394 and in German Offenlegungsschriften No. 1,929,034 and 2,004,048; polyisocyanates with urethane groups as described e.g. Belgian Patent Specification No. 752,261 or U.S. Patent Specification No. 3,394,164; polyisocyanates with acylated urea groups according to German Patent Specification No. 1,230,778; polyisocyanates with biuret groups as described e.g. in German Patent Specification No. 1,101,394 and U.S. Pat. No. 3,124,605; British Patent Specification No. 889,050 and French Patent Specification No. 7,017,514; polyisocyanates prepared by telomerization reactions as described, for example, in Belgian Patent Specification No. 723,640; polyisocyanates having ester groups such as those mentioned, for example, in British Patent Specification Nos. 956,474 and 1,072,956; U.S. Patent Specification No. 3,567,763 and German Patent Specification No. 1,231,688 and reaction products of the above mentioned isocyanates with acetals according to German Patent Specification No. 1,072,385.

The preferred polyisocyanates to be used are diisocyanates of the formula Q (NCO)$_2$ in which Q represents an aliphatic hydrocarbon group having from 4 to 12 carbon atoms, in particular a cycloaliphatic hydrocarbon group having from 4 to 15 carbon atoms. Particularly preferred polyisocyanates are hexamethylene diisocyanate: 1-methyl-2,4-diisocyanatocyclohexane; 1-methyl-2,6-diisocyanatocyclohexane; 1-isocyanato-3,3,5-trimethyl-5-isocyanatomethyl-cyclohexane; 4,4'-diisocyanato-dicyclohexylmethane and 2,4'-diisocyanatodicyclohexylmethane.

The dispersion to be used for the preparation of the isocyanate prepolymers are (a) dispersions of free radical addition polymers synthesized in polyhydroxyl compounds, in particular in polyhydroxypolyethers, or polyethers modified by grafted vinyl polymers as described in U.S. Patent Specifications Nos. 3,383,351, 3,304,273; 3,523,093 and 3,110,695 incorporated herein by reference or in German Patent Specification No. 1,152,536;

(b) dispersions of aminoplast condensates synthesized in organic polyhydroxyl compounds of the kind described in U.S. Patent Application Ser. No. 464,099 filed Apr. 23, 1974 and copending herewith, in German Offenlegungsschrift No. 2,324,134, in German Patent Application P 25 12 385.7 or in U.S. Patent Application No. 664,324 filed March 5, 1976 and copending herewith; or preferably (c) dispersions of polyisocyanate addition products synthesized in organic polyhydroxyl compounds or mixtures of different organic polyhydroxyl compounds having an (average) molecular weight of about 200 to about 16,000 preferably of about 500 to about 12,000.

The last mentioned, preferred dispersions are stable dispersions, having a solids content of from 5 to 60% by weight and preferably 10 to 30% by weight, of polyurethanes and in particular polyureas and/or polyhydrazodicarbonamides in polyhydroxyl compounds such as those described e.g. in U.S. Pat. No. 3,325,421 incorporated by reference herein, in German Auslegeschrift No. 1,260,142 or in German Patent Applications P 25 13 815.2; P 25 50 833.2; P 25 50 862.7; P 25 50 796.4; P 25 50 797.5 or P 25 50 860.5 or in U.S. Patent Applications Ser. Nos. 691,174 filed May 5, 1976; 740,450; 740,451; 740,452; 740,454; and 740,465 all filed Nov. 10, 1976. According to the information given in the literature cited here, dispersions of this kind can be obtained by reaction of polyisocyanates of the kind indicated above with polyhydroxyl compounds and, preferably, polyamines having primary and/or secondary amino groups and/or hydrazine and/or hydrazides in organic polyhydroxyl compounds as reaction medium. In the less preferred case of using polyhydroxyl compounds as reactants, a more selective reaction can be obtained by using, as reactants, polyhydroxyl compounds having exclusively primary hydroxyl groups, and, as reaction medium, polyhydroxyl compounds having preferably secondary hydroxyl groups.

Particularly preferred dispersions for the preparation of the isocyanate prepolymers which are an essential component of the invention are dispersions of the kind described in German Patent Application P 25 13 815.2; P 25 50 833.2 and P 25 50 862.7 and in U.S. Patent Application Ser. No. 691,174 filed May 5, 1976 and copending herewith, in polyhydroxypolyethers having molecular weights of about 200 to 16,000 preferaby about 500 to 12,000, or in mixtures of such polyhydroxypolyethers containing up to about 10% by weight, based on the total quantity of polyhydroxyl compounds, of low molecular weight polyhydroxyl compounds having molecular weights of from about 62 to 200, which dispersions should preferably have a maximum viscosity of 10.000 cP at 25° C.

Among the last mentioned particularly preferred dispersions, those in which the polyether component has a hydroxyl functionality of about 2.5 to 3.5 and a hydroxyl number of about 25 to 60 and which contain from about 10 to 30% by weight of dispersed solids and have a viscosity at 25° C. of less than about 3500 cP are particularly suitable. The dispersed solids content most preferably consists of reaction products of diisocyanates of the kind given above as examples, in particular 2,4- and 2,6-diisocyanatotoluene or 4,4'-diisocyanatodiphenylmethane with approximately equivalent quantities of hydrazine or hydrazine hydrate. A typical method of preparation of such dispersions is described in Example 1.

If desired, compounds with hydroxyl groups, e.g. monohydric alcohols, hydroxyl polyethers, hydroxyl polyesters or hydroxyl polycarbonates, may be added to the dispersions mentioned under (a) to (c) above either before or after the reaction with a polyisocyanate, as required, the added hydroxyl component then also reacting with the excess polyisocyanate. However, the concentration of dispersed polymers, polycondensates or polyaddition products in the dispersions should always be such that, even after dilution with the additional polyhydroxyl compounds mentioned above, the dispersions put into the reaction with the polyisocyanates have a concentration of at least about 5% by weight and preferably at least about 10% by weight of polymers, polycondensates or polyaddition products.

The reaction of the dispersions mentioned under (a) to (c) with the above mentioned polyisocyanate is carried out at about 0° to 200° C., preferably about 60° to 120° C. The reactants are put into the process in proportions corresponding to a molar NCO/OH ratio, based on the isocyanate groups of the polyisocyanate and the hydroxyl groups of the dispersions, including the hydroxyl groups of any additional hydroxyl compounds, of between about 1.2:1 and 30:1, preferably between about 1.5:1 and 5:1. When aromatic polyisocyanates are used, the polyol dispersion is introduced into the polyisocyanate. When polyisocyanates having aliphatically or cycloaliphatically bound isocyanate groups are used, it is immaterial in which sequence the components are added.

The mixtures according to the invention which are capable of being hardened with water are prepared by mixing the oxazolidine component with the polyisocyanate component. The sequence in which the two substances are brought together is immaterial. As far as possible, moisture should be excluded during the mixing process. The proportions in which the two substances are to be mixed depends on their isocyanate group content and oxazolidine group content. As a general rule, at least one isocyanate group should be present in the mixture for each oxazolidine group. The molar ratio of oxazolidine groups to isocyanate groups should be between about 0.9:1 and 1:10 and preferably between about 1:1 and 1:3. The mechanical properties of the hardened mixtures can easily be adjusted by suitable choice of this molar ratio.

The usual auxiliary agents and additives may be added to the mixtures according to the invention before use, e.g. plasticizers based on phosphoric or phthalic acid esters, pigments and fillers such as titanium dioxide, heavy spar, chalk or carbon black; catalysts such as toluene sulphonic acid, lead octoate or dibutyl tin laurate; leveling agents; possibly stabilizers such as ionol. Anhydrous solvents which are inert towards isocyanate groups and oxazolidines may also be used although, according to the invention, the mixtures according to the invention are preferably used solvent-free.

The mixtures according to the invention prepared in this way undergo no change in storage for several months, in the absence of moisture and constitute one-component systems which rapidly harden in the presence of atmospheric moisture.

The mixtures according to the invention may be applied by any methods for producing coatings and joint seals, for example, they may be applied with doctor rollers or by rolling, brush coating, spraying with airless spraying machines by the heat spray process or by conventional spraying using the usual apparatus. In the last mentioned case, it is advisable to use suitable solvents such as hydrocarbons, esters or ketones.

The mixtures according to the invention have interesting properties which were not to be expected on the basis of the known art. Whereas, hitherto, the dispersions used as a basis for the isocyanate prepolymers which are essential to the invention were used mainly for the manufacture of molded polyurethane products, the single component compounds according to the invention make it possible to obtain unfoamed and non-porous lacquers, coatings and grouting compositions. This important precondition for using the mixtures according to the invention for the above mentioned fields of application could not be foreseen since crosslinking can only be achieved by a reaction with water (atmospheric moisture) and consequently one would have expected the isocyanate groups present in the mixtures according to the invention to react with this water with the formation of carbon dioxide and hence bubbles.

Compared with the systems according to German Offenlegungsschrift No. 2,018,233, the mixtures according to the invention have optimum stability in storage in the absence of moisture and reactivity on exposure to moisture. The coatings prepared from the mixtures according to the invention have excellent stability to light in spite of the addition of polyether polyols when aliphatic or cycloaliphatic polyisocyanates are used, and they harden rapidly to form dry and non-blocking surfaces.

The mixtures according to the invention may be applied to any substrates such as metals, concrete, asbestos cement, asphalt or synthetic resins such as polyvinyl chloride, polystyrene or polyurethane. They are suitable for the production of coatings, grouting compositions and fillers. They are also suitable for bonding substrates which differ from each other, e.g. for bonding plastics, glass compositions or glass to metals, wood or plastics.

The following Examples serve to explain the invention.

The following oxazolidines were used in the examples:
- (A) N,N'-bis-[(2-isopropyl-1,3-oxazolidin-3-yl)-ethoxycarbonyl]-1,6-diaminohexane
- (B) N,N'-bis-[(2-isopropyl-1,3-oxazolidin-3-yl)-ethoxycarbonyl]-2,4-tolylenediamine in the form of a 90% solution in xylene.
- (C) Bis-2-(1,3-oxazolidin-3-yl)-ethyl adipate.

EXAMPLES

EXAMPLE 1

A polyether of propylene oxide which has been started on trimethylolpropane and tipped with ethylene oxide (ratio by weight of propylene oxide to ethylene oxide 83:17) and which has a hydroxyl number of 34 is used for the preparation of an isocyanate prepolymer.

In two stirrer vessels connected in series which are equipped with spike stirrers (volume of reaction chamber 1.5 l and 0.5 l, respectively; velocity of rotation 1500 revs/min), 800 g of the polyether, 169 g of a mixture of 80% 2,4- and 20% 2,6-tolylene diisocyanate and 49 g of hydrazine hydrate are continuously introduced per minute at room temperature. The three components flow separately from each other directly into the mixing zone of the first stirrer vessel. The polyether is delivered from its storage vessel by way of a gear wheel pump while the other two components, which are thin liquids, are delivered from separate storage vessels by way of piston dosing pumps. Polyaddition takes place as an exothermic reaction in the stirrer apparatus. The reaction temperature is adjusted to 100° to 105° C. by cooling the stirrer apparatus. After a residence time of about 2 minutes, an almost completely reacted white dispersion leaves the second stirrer apparatus. The dispersion is transferred to an intermediate vessel where it is kept at 80° to 100° C. with stirring. The water from the hydrazine hydrate is then distilled off under vacuum at 100° C. A stable, white, finely divided 20% dispersion having a hydroxyl number of 27, a viscosity of 2100 cP/25° C. and a pH of 8.2 is obtained.

500 g of this polyether dispersion are mixed with 60 g of 3,3,5-trimethyl-5-isocyanatomethylcyclohexylisocyanate and reacted at 80° to 100° C. A prepolymer containing 2.2% of isocyanate groups and having a viscosity of about 9000 cP at 25° C. is obtained. No precipitate separates from the white liquid even after prolonged storage.

EXAMPLE 2 (Comparison experiment)

For preparing an isocyanate prepolymer in accordance with the known art and not modified by a dispersion, the same polyether is used as in Example 1 but without the dispersed polyurea. The quantity of diisocyanate is somewhat increased in order that about the same isocyanate content may be obtained as in Example 1.

500 g of polyether are reacted as indicated in Example 1 with 67 g of 3,3,5-trimethyl-5-isocyanatomethyl-cyclohexyl isocyanate. The isocyanate content of the prepolymer is 2.2%. It is a clear liquid and has a viscosity of 7000 cP at 25° C.

EXAMPLE 3

200 g of a linear propylene oxide polyether which has been started on propylene glycol and has a hydroxyl number of 112 and an average molecular weight of 1000 are added to 600 g of the polyether dispersion from Example 1. A homogeneous mixture is prepared and to this are added 158 g of 3,3,5-trimethyl-5-isocyanatomethyl-5-cyclohexylisocyanate. The mixture is left to react to a constant isocyanate content, which amounts to 3.2% and is obtained after 30 hours at 80° C. A white dispersion containing free isocyanate groups and having a viscosity of 10,000 cP at 25° C. is obtained.

EXAMPLE 4 (Experiment for comparison to Example 5)

44.5 g of 3,3,5-trimethyl-5-isocyantomethylcyclohexyl isocyanate are added to 400 g of a propylene oxide polyether which has been started on trimethylolpropane and has a hydroxyl number of 28, and the mixture is heated to 100° C. until its isocyanate content is 1.9% and undergoes no further change on heating. An isocyanate prepolymer having a viscosity of about 2000 cP at 25° C. is obtained.

EXAMPLE 5

The same polyethter is used as indicated in Example 4. In contrast to Example 4, however, this polyether in addition contains, in the form of a dispersion, 5% by weight of a polyurea of tolylene diisocyanate and hydrazine. Preparation of this dispersion was carried out as indicated in Example 1. 400 g of the polyether dispersion are reacted with 44.5 g of 3,3,5-trimethyl-5-isocyanatomethyl-cyclohexyl isocyanate as in Example 4. An isocyanate prepolymer having a viscosity of about 2400 cP at 25° C. and an isocyanate content of 2.0% are obtained.

EXAMPLE 6

An isocyanate prepolymer containing 5.1% of free isocyanate groups is prepared from 210 g of a 10% dispersion which has been prepared in situ of a polyurea of tolylene diisocyanate and hydrazine in a polyester of adipic acid, ethanediol, diethyleneglycol and butane-1,4-diol, which polyester has a hydroxyl number of 56 (preparation similar to that of Example 1) and 54 g of 3,3,5-trimethyl-5-isocyanatomethyl-cyclohexylisocyanate.

EXAMPLES OF PRACTICAL APPLICATION

EXAMPLE 7

In this example, a comparison is drawn between mixtures according to the present state of the art and mixtures according to the invention. The rate of hardening, i.e. the formation of a skin and complete hardening, the nature of the surface and the stability of the mixtures in storage are investigated and compared.

To 100 parts by weight of the isocyanate prepolymers described in Example 1 and in Example 2 are added in each case 12 parts by weight of oxazolidine A and, as catalyst, 1 part by weight of lead octoate (lead content 24%). The components are homogeneously mixed with exclusion of moisture. The mixtures obtained are tested as moisture hardening single component binders and coating compounds.

The results obtained are shown in the following table: The mixtures were applied to glass plates to form layers thereon 5 mm in thickness.

|  | Mixture obtained from isocyanate prepolymer from Example 1 | Mixture obtained from isocyanate prepolymer from Example 2 (comparison experiment) |
|---|---|---|
| Formation of skin at 25° C and 50% relative humidity | after 2 hours, a skin has formed and does not break when touched | formation of skin only after 6 to 8 hours |
| Complete hardening at 25° C and 50% relative humidity | 2 to 3 mm in 24 hours | 1 mm in 24 hours |
| Surface characteristics of the completely hardened materials | surface dry, glossy | surface sticky and dull |
| Stability of the mixture in storage at 50° C | still intact after 10 days still intact after 15 days severely thickened after 25 days | highly viscous after 15 days no longer usable after 15 days |

This comparison shows that the mixture according to the invention has distinct advantages in all the properties investigated.

EXAMPLE 8

In this Example, the isocyanate prepolymer from Example 3 is mixed with various oxazolidines A, B and C and various fillers and the mixtures obtained are used as moisture hardening binders for concrete floors.

Composition of the mixtures

|  | Mixture A | Mixture B | Mixture C |
|---|---|---|---|
| Isocyanate prepolymer from Example 3 | 100 parts | 100 parts | 100 parts |
| Oxazolidine A | 12 parts | — | — |
| Oxazolidine B | — | 15 parts | — |
| Oxazolidine C | — | — | 9 parts |
| Heavy spar powder | 70 parts | 70 parts | 70 parts |
| Titanium dioxide | 10 parts | 10 parts | 10 parts |
| Carbon black | 0.5 parts | 0.5 parts | 0.5 parts |
| Petroleum hydrocarbons (boiling range 140–180° C) | 10 parts | 15 parts | 10 parts |

The mixtures are used to cover concrete with a coating 1.5 mm in thickness and the properties of this coating are investigated:

|  | Mixture A | Mixture B | Mixture C |
|---|---|---|---|
| Conditions of hardening | 25° C 50% relative humidity | 25° C 50% relative humidity | 25° C 50% relative humidity |
| Skin formation | after 2 hours | after 1.5 hours | after 2 hours |
| Complete hardening | completed after 1 day | after 1 day | after 1 day |
| Surface of coating after 24 hours | dry, non-tacky, can be walked over | dry, non-tacky, can be walked over | dry, non-tacky, can be walked over |
| Shore A hardness | 70 | 80 | 50 |

This example shows that all three mixtures are well suited for coating a concrete floor.

EXAMPLE 9

This example describes the preparation and use of a coating compound for undersealing a car with a mixture according to the invention combined with coal tar.

Composition of the coating compound:

| Oxazolidine A | 14 parts |
|---|---|
| Isocyanate prepolymer from Example 4 | 100 parts |
| Dibutyl tin dilaurate | 0.3 parts |
| Anhydrous tar fraction | 50 parts |
| Heavy spar | 150 parts |
| Thickener (based on fine asbestos fibers) | 3 parts |
| Xylene (mixtures of isomers) | 20 parts |

The coating compound is applied to the undersurface of the car body in a thickness of 3 mm at room temperature and 60% relative humidity. The coating is found to have the following properties:

A first skin has formed after 30 minutes. After one day, the compound has hardened right through and reached its final state. The coating is distinguished by firm bonding to its undersurface, excellent protection against corrosion and excellent resistance to impact by stones.

EXAMPLE 10

This example describes the preparation of a permanently elastic coating compound for filling cracks due to expansion in buildings. This compound is also compared with a product not produced in accordance with the invention. The mixture according to the invention is referred to as mixture A and the mixture not according to the invention as mixture B.

Composition of the coating compounds:

|  | Mixture A | Mixture B |
|---|---|---|
| Isocyanate prepolymer from Example 5 | 100 parts | — |
| Isocyanate prepolymer from Example 4 | — | 100 parts |
| Biuret polyisocyanate based on hexamethylene diisocyanate | 2 parts | 2 parts |
| Oxazolidine A | 15 parts | 15 parts |
| Lead octoate (24% Pb) | 1 part | 1 part |
| Titanium dioxide | 5 parts | 5 parts |
| Chalk powder | 75 parts | 75 parts |
| Highly disperse silicate | 15 parts | 15 parts |
| Alkylsulphonic acid phenol (cresol) ester (as plasticizer) | 100 parts | 100 parts |

Both formulations give rise to stable sealing compounds which can be kept in storage and hardened by moisture. They have the following properties:

|  | Mixture A | Mixture B |
|---|---|---|
| Time required for skin formation | 1.5 hours | 3 hours |
| Shore A hardness | 20 | 20 |
| Stress modulus | 2 kp/cm² at 100% strain | 2 kp/cm² at 100% strain |
| Surface characteristic | dry | sticky and clammy |
| Weathering resistance (measured in sunshine weatherometer, Model XW) after 500 hours' exposure | onset of chalking | severe chalking and formation of cracks |

The results show that the coating compound according to the invention provides clear advantages in the skin formation time, surface characteristics and response to weathering.

EXAMPLE 11

For preparing a single component lacquer which can be sprayed for outdoor application, 100 g of the isocyanate prepolymer from Example 6 are triturated with 50 g of titanium dioxide and 100 g of monoethylether glycol acetate to improve wetting of the inorganic pigment. 24 g of oxazolidine A and 2.5 g of a silicon leveling agent (10% in xylene) are then added. The mixture is stable in storage for several weeks at room temperature if moisture is excluded.

When the mixture is applied to steel sheets by means of a conventional spray apparatus, it hardens to a high gloss lacquer in about 2 hours at 25° C. and 50% relative humidity.

| Additional properties: (tested after 48 hours) | |
|---|---|
| Thickness of layer | about 60 μ |
| Pendulum hardness (DIN 53 157) | 120 sec. |
| Grid section test (DIN 53 150) (bonding) | 1 |
| Resistance to xylene and superblend petrol (5 minutes) | no sign of beginning solution or swelling. |

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. Mixture capable of being hardened by water, containing an oxazolidine component and a polyisocyanate component, characterized in that the mixture contains, as polyisocyanate component, an isocyanate prepolymer which has free isocyanate groups and is the reaction product of excess quantities organic polyisocyanates with dispersions of polymerization, polycondensation or polyaddition products in organic polyhydroxyl compounds.

2. Mixture capable of being hardened by water, which mixture contains an oxazolidine of the formula

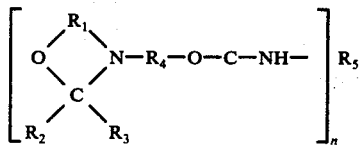

and a polyisocyanate component, in which formula
$R_1$ represents an aliphatic hydrocarbon group having from 2 to 6 carbon atoms,
$R_2$ and $R_3$ may be the same or different and represent hydrogen, aliphatic hydrocarbon groups having from 1 to 4 carbon atoms, cycloaliphatic hydrocarbon groups having from 5 to 7 carbon atoms or aromatic hydrocarbon groups having from 6 to 10 carbon atoms or they may form a 5-membered or 6-membered cycloaliphatic hydrocarbon ring together with the ring carbon atom,
$R_4$ represents an aliphatic hydrocarbon group having from 2 to 6 carbon atoms,
$R_5$ represents a group such as can be obtained by removal of the isocyanate groups from a polyisocyanate having a valency of $n$ and
$n$ represents an integer of from 1 to 6, characterized in that the mixture contains, as organic isocyanate component, a prepolymer which has free isocyanate groups and is the reaction product of excess quantities organic polyisocyanates having aliphatically and/or cycloaliphatically bound isocyanate groups with dispersions, having a solids content of about 5 to 60% by weight, of polyurethanes, polyureas of polyhydrazo-dicarbonamides in organic polyhydroxyl compounds having molecular weights of about 200 to 16,000.

3. Process for coating a substrate comprising
(a) combining the mixture of claim 1 with known auxiliary agents and additives,
(b) applying said combination to the substrate, and
(c) exposing the applied combination to moisture until it cures.

4. Process for grouting a crevice comprising
(a) combining the mixture of claim 1 with known auxiliary agents and additives,
(b) placing said combination in the crevice to be grouted, and
(c) exposing said grouting to moisture until it cures.

5. In a hydrocurable composition comprising an oxazolidine and a polyfunctional isocyanate, the improvement wherein the polyfunctional isocyanate is the prepolymer reaction product of organic polyisocyantes and a dispersion selected from the group consisting of
(a) a dispersion formed by synthesizing a free radical addition polymer in organic polyhydroxyl compounds,
(c) a dispersion formed by synthesizing an aminoplast polycondensate in organic polyhydroxyl compounds, and
(c) a dispersion formed from reacting a polyisocyanate with a reactant selected from the group consisting of polyhydroxyl compounds, polyamines with primary or secondary amino groups, hydrazine and hydrazides in a polyhydroxyl compound reaction media which is less reactive with isocyanates than said reactant.

6. In the composition of claim 5, the further improvement wherein
(a) the prepolymers are formed at temperatures of between about 0° and 200° C. and at an NCO to OH ratio of between about 1.2:1 and 30:1, and
(b) the molar ratio of oxazolidine groups to isocyanate groups is between about 0.9:1 and 1:10.

7. In the composition of claim 6, the further improvement wherein the polyether dispersion has
(a) a hydroxyl functionality of about 2.5 to 3.5 and a hydroxyl number of about 25 to 60,
(b) a dispersed solids content of about 10 to 30 wt. %.
(c) a viscosity at 25° C. of less than about 3500 cP, and
(d) contains up to 10 wt. %, based on the total amount of polyhydroxyl compounds, of polyhydroxyl compound having molecular weights of about 62 to 200.

8. In the composition of claim 7, the further improvement wherein said dispersed solids are formed by the in situ reaction of approximately equivalent quantities of hydrazine or hydrazine hydrate and an isocyanate selected from the group consisting of 2,4- and 2,6-diisocyanato toluene, and 4,4'-diisocyanato diphenylmethane.

9. A hydrocurable composition comprising
(a) an oxazolidine of the formula

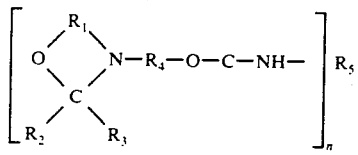

in which
- $R_1$ represents an aliphatic hydrocarbon group having from 2 to 6 carbon atoms,
- $R_2$ and $R_3$ may be the same or different and represent hydrogen, aliphatic hydrocarbon groups having from 1 to 4 carbon atoms, cycloaliphatic hydrocarbon groups having from 5 to 7 carbon atoms or aromatic hydrocarbon groups having from 6 to 10 carbon atoms or they may form a 5-membered or 6-membered cycloaliphatic hydrocarbon ring together with the ring carbon atom
- $R_4$ represents an aliphatic hydrocarbon group having from 2 to 6 carbon atoms,
- $R_5$ represents a group such as can be obtained by removal of the isocyanate groups from a polyisocyanate having a valency of $n$ and
- $n$ represents an integer of from 1 to 6, (b) a prepolymer having free isocyanate groups which is the reaction product of (i) organic polyisocyanates and (ii) dispersions formed by the in situ synthesis of polyurethanes, polyureas or polyhydrazo-dicarbonamides in polyhydroxy polyethers having molecular weights of about 200 to 16,000 or in mixtures of such polyether with up to about 10% by weight based on the total amount of polyhydroxy compounds of polyhydroxyl compounds having molecular weights of from about 62 to 200 said dispersions having solids contents of about 5 to 60 wt. % of said synthesis products.

10. The composition of claim 9, wherein
(a) the solids dispersed are formed by the in situ reaction of hydrazine or hydrazine hydrate with aliphatic or cycloaliphatic isocyanates and are present at between about 10 and 30 wt. %,
(b) the dispersion has a hydroxyl functionality of about 2.5 to 3.5, a hydroxyl number of about 25 to 60, a viscosity at 25° C. of less than about 3500 cP, and contains up to about 10 wt. % of polyhydroxyl compounds having molecular weights of from about 62 to 200,
(c) the prepolymer is formed at temperatures between about 0 and 200° C. with an NCO to OH ratio of between about 1.2:1 and 30:1, and
(d) the ratio of oxazolidine groups to isocyanate groups in said composition is between about 0.9:1 and 1:10.

* * * * *